United States Patent [19]

D'Atri et al.

[11] 4,207,347
[45] Jun. 10, 1980

[54] FAT BASED PRESERVATIVE COATING AND METHOD FOR PRESERVING FOODS

[75] Inventors: John J. D'Atri, Zephyr Cove, Nev.; Ronald Swidler, Palo Alto, Calif.; Judith J. Colwell, Menlo Park, Calif.; Thomas R. Parks, Sunnyvale, Calif.

[73] Assignee: Eterna-Pak, San Rafael, Calif.

[21] Appl. No.: 935,910

[22] Filed: Aug. 23, 1978

[51] Int. Cl.² ............................ A23B 4/10; A23B 7/16
[52] U.S. Cl. ........................................ 426/92; 426/102; 426/307; 426/310; 426/332; 426/652; 426/662
[58] Field of Search ............... 426/310, 608, 331, 332, 426/333, 92, 102, 307, 652, 662

[56] References Cited

U.S. PATENT DOCUMENTS

| | | | |
|---|---|---|---|
| 237,905 | 2/1881 | Reese | 426/307 |
| 1,098,575 | 6/1914 | Hopkins | 426/92 |
| 1,985,846 | 12/1934 | Trowbridge | 426/310 |
| 2,775,189 | 7/1956 | Gericke | 426/310 |
| 3,406,081 | 10/1968 | Bauer et al. | 426/310 |
| 3,451,826 | 6/1969 | Mulder | 426/310 |
| 3,674,505 | 7/1972 | Shinkawa | 426/310 |

Primary Examiner—Jeanette M. Hunter
Attorney, Agent, or Firm—Bruce & McCoy

[57] ABSTRACT

A preservation coating composition primarily for meat containing lard, tallow and lecithin in specific ratios. The mixture is heated and applied in molten condition to the chilled food to be preserved. The coated food is cold stored.

10 Claims, No Drawings

FAT BASED PRESERVATIVE COATING AND METHOD FOR PRESERVING FOODS

BACKGROUND OF THE INVENTION

1. Field of the Invention

The present invention relates to the field of packaging and preservation of foods and more particularly to a composition and method for preserving foodstuffs with a fat based edible coating.

2. Description of the Prior Art

The living patterns of modern society have resulted in large populations of people located at considerable distances from the sites of agriculture and the sources of food. These people nonetheless desire fresh meats and fruits and vegetables. In addition to the time required for transportation of fresh foods to these populations, there is also a time requirement for storage of fresh foods at the point of distribution before the food is used by the ultimate consumer. Most fruits and vegetables begin to deteriorate and lose some of their nutritional value, as well as their characteristics of freshness, as soon as they are harvested. The length of possible storage time varies with the type of fruit or vegetable and for example, it may extend from 3 to 12 weeks under conventional storage conditions for oranges. (for example) Freshly slaughtered meat may be stored under refrigeration without any protective treatment for approximately one to two weeks. Then it deteriorates rapidly with the development of an undesirable odor, color changes, and tissue breakdown, and ultimately becomes unsuitable for human consumption.

Various processes have been developed for extending the shelf life or storage time of some foods, such as curing, dehydration, canning and freezing. These processes subject the food to certain irreversible reactions in many cases, however, which destroy the fresh quality of the foods.

The shelf lives of some fruits and vegetables have been extended by the application of certain resins, shellacs, vegetable wax or paraffin to their outer surface. But after an extended time, even these coated fruits and vegetables lose their retained moisture and freshness. In addition, many consumers object to preservative coatings or sprays which are not easily removed and are consumed with the food.

In the wholesale meat industry and in particular, that part of the industry which supplies portion-controlled servings of meat to the food service industry, the current storage method for meat is to enclose it in a plastic wrap either by means of a vacuum and heat-sealing process known as BIVAC or by means of a perimeter heat-sealed bag known as CRYOVAC. These sealing methods may increase the refrigerated shelf life of meat to a maximum of 30 days from slaughter but they allow the meat to lose a certain percentage of its weight in nonrecoverable meat juices which is called drip loss.

If the meat is frozen it may be stored for several months or longer. However freezing may also cause certain changes in the water-holding capacity of the meat and unless the freezing and thawing process is done very carefully there may be a denaturation of meat protein, freezer burn, or a large drip loss upon thawing. Because of these possible structural changes due to freezing, it is preferable for the best grades of meats to be shipped chilled rather than frozen.

In addition, there is an increased energy cost in maintaining meat in a frozen state rather than in keeping it chilled. Transportation costs are also greater for shipping frozen meat because of the need to use very low temperature compartments for the meat or to ship it by air freight. It would be much less difficult and accordingly, more economical to transport chilled meat and other foods to more distant points of demand by surface methods.

Many members of the population are also concerned about possible adverse health effects which may result from the use of plastic coverings or synthetic coatings which contact the food directly and may interact with it. In addition, government agencies regulating coating ingredients and processes for use with food have proven to be more willing to approve products, additives and processes derived from or utilizing natural ingredients or sources than those having synthetic origins.

There is thus a need for a preservative coating and a method for preserving foods which extends the presently limited storage time for foods, including fruits and vegetables and especially meats, without substantially affecting their quality. There is also a need for a method and a preservative coating which utilizes relatively inexpensive, naturally-occurring ingredients. The method and composition of the present invention overcome these problems, and surprisingly, at least double the expected shelf life of meats and other foods that have been so coated, thereby extending the potential shipment time of food products and enabling members of the wholesale food industry to utilize less expensive methods of shipping. The method and composition of this invention also substantially reduce drip loss of meat and moisture loss in other foods and allow the foods to retain their fresh characteristics for a longer period of time than by conventional methods.

SUMMARY OF THE INVENTION

The present invention is a preservative coating consisting essentially of a major portion of a fat more saturated than lard, a smaller portion of lard, and a minor amount of a wetting agent. The present invention also includes a method of preserving foods which consists essentially of the steps of mixing lard with a second fat which is more saturated than lard and a wetting agent, heating the mixture to a temperature sufficient to liquefy the ingredients thereof, coating a food with the liquefied mixture to provide a generally uniform continuous coating, allowing the coating to harden sufficiently to withstand major deformation upon handling, and maintaining said coated food in a chilled environment throughout a period of storage.

OBJECTS OF THE INVENTION

It is therefore an important object of the present invention to provide a method and a composition which will considerably extend the shelf life of various fresh foods and especially beef, in a chilled state without permanent alteration thereto.

It is another object of the invention to provide a coating composition for preserving food which in the preferred embodiment consists essentially of relatively inexpensive natural substances.

It is yet another object of the present invention to provide a method and a composition which will reduce the drip loss of stored fresh meat and the moisture loss in fruits and vegetables.

It is yet a further object of the present invention to provide a coating composition which will easily conform to the shape of the product being coated and can be easily removed.

It is still another object of the invention to provide a method for preserving fresh food which will enable the industry to utilize the most efficient and economical methods for transporting the food over relatively greater distances and time periods than presently available.

Other objects and advantages of the invention will become apparent when it is discussed in further detail hereafter.

DESCRIPTION OF THE PREFERRED EMBODIMENT

The present invention is a preservative coating consisting essentially of a portion of a fat more saturated than lard, an equal or smaller portion of lard and a minor amount of a wetting agent. Lard is an edible animal fat which may be defined as the fat rendered from certain fresh, clean, sound fatty tissues of hogs. The exact composition and characteristics of lard may vary according to the feed of the animals as well as the part of the animal from which it was taken. Lard and other natural fats contain a mixture of various fatty acids and other organic substances. Lard generally contains a greater percentage of unsaturated organic components than of saturated ones. The term "saturated" refers to the absence of double carbon bonds in a compound. "Unsaturated" organic substances are those which have double or triple bonds and which may be hydrogenated, that is, hydrogen may be added to unsaturated compounds to reduce the number of double bonds by increasing the carbon-hydrogen bonds and increasing the saturation.

Commercial lard may consist of lard and hydrogenated, or hardened, lard. Commercial lard may also contain minor amounts of certain FDA-approved additives such as propyl gallate, BHA, BHT or citric acid. In some of the examples set forth hereinafter, commercial lard which had been obtained from a local supermarket was used. It is expected that most variations or additives in the lard would not be of such proportion as to materially effect the coating composition within the parameters of this invention. The portion of lard in the preferred coating composition will be between approximately 30% and 50% of the total composition.

The composition of this invention also includes a second fat. This second fat, which is a major portion of the preservative coating, is a more saturated fat than lard, that is, it has a higher percentage of components with saturated bonds than does lard. The second fat may be selected from a group consisting of tallow or of partially hydrogenated lard. In the preferred embodiment the second fat is tallow. Edible tallow is typically obtained from beef cattle and is generally "harder" than lard. Tallow contains a mixture of various fatty acids and other compounds but it is not believed that the variations in tallow would have a material effect on the composition of this invention. The edible tallow used in the examples reported hereinafter was obtained from a local supplier. The portion of tallow or other second fat may vary in the preferred coating mixture from between 70% and 50% by weight of the total composition.

A further addition to the composition of this invention is a minor amount of a wetting agent. A suitable wetting agent will be present in the mixture generally not in excess of 1% by weight. For convenience the percentage of the wetting agent is treated as being 1% although it is actually 1 part in addition to 100 parts of the other components. The term "wetting agent" as used in this application refers to any emulsifier or surface active agent which enhances the solution of one liquid in another or reduces the surface tension between two components not otherwise soluble in each other. It is believed that the wetting agent in this invention promotes proper adhesion between the fatty components of the composition and the moisture contained in the food being coated leading to a closer and stronger bond between the aqueous food phase and the coating. It is expected that various wetting agents may be suitable in this composition. However, in the preferred embodiment, the wetting agent consists essentially of lecithin which is a naturally derived emulsifier. Although an antioxidant is not believed to be necessary to the operation of the invention, it is believed that lecithin may also act as an antioxidant in the coating, and particularly in the presence of the small amounts of BHT and BHA, which are commonly present in commercial lard.

Thus, this composition for coating and preserving foods consists essentially of a mixture of (a) lard, (b) a second fat, and (c) a suitable wetting agent, the ratios of (a), (b), and (c) being between approximately 30:70:1 and 50:50:1. A composition of pure lard and lecithin has been found to be unsuitable because it is too soft and does not prevent internal oozing of the meat drip. On the other hand a coating of pure tallow and lecithin has a tendency to crack, and it is essential to an extension of the shelf life of the food that there be no cracks or breaks in the coating. It has been found that the preferred composition of this invention is a mixture of lard, tallow and lecithin in an approximate ratio of 40:60:1. The blend of this composition formed by the preferred ratio provides an effective preservative coating in that it conforms easily to the shape of the cut of the meat or other food when melted or liquid but maintains a protective coating for the food once it is hardened. This composition unexpectedly extends the amount of time that meat and other foods coated with the composition can be stored over the storage time of conventionally wrapped food held in a chilled condition.

The present invention is also a method of preserving foods, consisting essentially of several steps, the first of which comprises mixing lard, a second fat, said second fat being more saturated than lard, and a wetting agent. The composition of the mixture of this process consists essentially of the components and elements described previously herein. It is anticipated that strengthening agents, such as cotton fiber, could also be added to the mixture, if desired, to strengthen the final coating.

The next step of this method consists essentially of heating the preferred mixture to a temperature sufficient to liquefy it. It is considered that this mixture is liquefied as the term is used herein when the components of the composition are sufficiently melted to blend together in a flowable solution. It is to be understood that fat based mixtures do not have a precise melting point because of the nature of their components. The temperature of the coating mixture when it is applied to the food in the preferred embodiment is approximately 85° F. (29.4° C.).

The food is then coated with the liquid or melted mixture to provide a generally uniform continuous coating. The food can be coated by dipping it into the liquid mixture and allowing any excess coating to drip off the food. It is also anticipated that the food could be sprayed with the mixture to achieve a uniform coating. In some circumstances it may be feasible to place the food items on flats and pour the coating over it in a continuous process. It is believed that the preservative effect is achieved by a minimal coating so long as the food is thoroughly covered. Generally a ⅛ inch (0.32 cm) coating has been found to be effective in the preferred embodiment. The food is maintained prior to coating at a temperature that will inhibit spoilage. In the case of meat, this would generally require keeping the meat refrigerated or at least in a condition chilled to below standard room temperature until it has been coated.

The next step of this method consists essentially of allowing the coating to harden sufficiently to withstand major deformation upon handling. Ordinarily, chilling the coated food slightly below standard room temperature will allow the coating to become sufficiently hardened to allow it to be handled. In the preferred embodiment the surrounding environment during the coating process was maintained at 50° to 55° F. (10° to 12.8° C.). The time required for this step will vary according to the size of the food items being coated, the temperature of the surrounding environment, and so forth. Chilling the coated product will reduce the time necessary for hardening. It is desirable, however, not to immediately freeze the coated product, as cracking may then occur.

It may be desirable where excessive handling is expected that the food coated according to this method may be additionally wrapped by conventional means, for example, by the BIVAC process. It has been found that a conventional covering in addition to the coating of this invention reduces the probability of cracking the coating. Alternatively, the coating step may be repeated at this point for a thicker coat at the user's option.

The coated food is then maintained in a chilled environment throughout the period of storage. It is desirable that the storage temperature be maintained not higher than 40° F. (approximately 4° C.) and preferably at approximately 30° F. (−1° C.).

The composition and method of this invention may be illustrated by the following examples:

EXAMPLE I

A mixture of tallow, lard and lecithin in a 60:40:1 ratio was melted and adjusted to approximately 85° F. (29.4° C.). Meat samples at approximately 35° F. (1.7° C.) were dipped into the coating mixture. Among the meat samples dipped were portions of top round steak approximately 2×2×¾ inches (5×5×1.9 cm) as well as slices from a corned beef. It was not known how long the meat had already been stored before purchase but it is expected that it would have been 2–3 weeks old at that time. The samples were immersed in the coating mixture until the coating was at least ⅛ inch (0.32 cm) thick. The samples were refrigerated in a standard refrigerator for 15 to 20 minutes to harden the coating and were then stored in the refrigerator for three weeks. At the end of that time the odor, color, and taste of the meat samples were very acceptable and there were no indications of developing rancidity. There was also no drip loss or weight loss in any of the dipped samples.

EXAMPLE II

Ten-ounce prechilled New York strip steaks were dipped in a 60:40:1 (lard:tallow:lecithin) formulation which was held at approximately 80° F. (26.7° C.). The meat was maintained at approximately 50° to 55° F. (10° to 13° C.) prior to coating and the meat after coating was allowed to harden in an environment of 50° to 55° F. (10° to 13° C.). One-third of the samples were coated with the composition of this invention, one-third were coated, allowed to harden and enclosed in a standard BIVAC wrap, and one-third were wrapped in BIVAC only, without being coated. All steaks were then stored in a room maintained at a temperature of about 30° F. (−1° C.) for 5.5 weeks.

At the end of 5.5 weeks, the meat samples that had been wrapped in BIVAC alone were brown and smelled and tasted sour and were inedible even with cooking. In contrast the odor and color of the samples coated with the above formulation, including both those wrapped with BIVAC and those coated only, were good and the samples tasted fresh, even cooked to a medium rare stage. The perimeter fat was tasty and flavorful and had no hint of rancidity. There was no loss of meat drip.

EXAMPLE III

A number of oranges were also dipped in the tallow:lard:lecithin (60:40:1) formulation and maintained in a refrigerator for 3.5 weeks. At the end of that time the coated oranges still had a "just-picked", fresh appearance and flavor. Several oranges that had been stored in excess of six months under home refrigerator conditions were still fresh and juicy when peeled at that time and had no signs of a long storage life. Their flavor was good, there was no rind breakdown and general appearance was excellent.

Similarly, carrots, lemons, potatoes, cherries, bananas and grapes have been coated according to this invention and their storage life has been unexpectedly extended by several months. Extended shelf lives have also been obtained with cold cuts, wieners and corned beef when treated according to this invention.

The maximum storage time of different kinds of foods treated according to the composition and method of this invention has not yet been fully determined but the results already obtained have been surprising: the storage time of beef coated according to this invention is at least double the shelf life generally obtained by any conventional method and the fresh quality of beef and oranges treated according to this invention is unexpectedly good. The proper color is retained. Weight loss due to evaporation and to a decrease in the water-binding capacity of meat tissue is virtually eliminated and the meat tastes and smells fresh after storage. The fruit retains its moisture and fresh qualities.

It is anticipated that a coating thinner than that used in the examples set forth above may also give extended storage life. It is also expected that the process may be adapted so that the coating can be cooked off directly from the food product.

It is believed that the composition and method of this invention will be particularly advantageous for members of the wholesale meat industry. Large primal cuts of meat from freshly slaughtered animals could be coated with the composition according to the method of this invention at the site of slaughter. It is believed that the storage life of these large primal cuts could be extended from the present 3–4 weeks expected with conventional methods to at least 6–8 weeks and in some cases, possibly to 12 weeks, thereby allowing the meat to be shipped in a refrigerated condition over much longer distances by surface rather than the more expensive method of freezing the meat and shipping it by air.

This extended shelf life would open new markets and more economical methods of transporting food to populations for which shipment is presently impossible or excessively expensive. Because the components of the composition of the invention may be selected from naturally derived products, it is expected that the approval of regulatory agencies necessary for applying products directly to food will be facilitated. Since the compounds of this composition basically originate from by-products of the slaughter process, it is thought that this convenience will result in savings in the ultimate costs of meat. It is further anticipated the coating of this invention could be recycled, either for reuse as a coating or for use by the ultimate purchaser of the food as an edible fat source. The freshness of the products coated according to this invention and the absence of drip loss will provide a savings to the wholesale meat producers and will result in better quality products delivered to the consuming public. Thus, the method and composition of this invention are seen to provide a great improvement in preserving and storing food.

For purposes of this description certain specific examples have been employed but these are meant to be illustrative only and the invention should therefore not be limited except as necessitated by the appended claims.

It is claimed:

1. A composition of matter for coating and preserving food consisting essentially of a mixture of
   (a) lard
   (b) a second fat consisting essentially of tallow or of partially hydrogenated lard, and
   (c) a wetting agent to promote adhesion between the coating and the food said wetting agent comprising not more than 1% by weight of said mixture,
   the ratio of (a) to (b) being between approximately 30:70 and 50:50 and said mixture having the characteristic of forming an effective preservative coating at a temperature of approximately 85° F. (29.4° C.) when applied to food having a temperature below said coating temperature.

2. The composition of claim 1 further characterized in that the wetting agent consists essentially of lecithin.

3. The composition of claim 2 further characterized in that the preferred ratio of said lard to said second fat is approximately 40:60 and said lecithin does not exceed 1% of said mixture.

4. A method of preserving foods consisting essentially of
   (1) mixing lard, a second fat consisting essentially of tallow or of partially hydrogenated lard and a wetting agent, said mixture consisting essentially of 30%-50% by weight lard, 50%-70% by weight said second fat and not more than 1% by weight of a wetting agent,
   (2) heating said mixture to a temperature sufficient to liquefy the ingredients thereof,
   (3) adjusting said mixture to a temperature of approximately 85° F. (29.4° C.) and coating a food with said mixture to provide a generally uniform continuous coating said food having an interior temperature lower than 85° F. (29.4° C.),
   (4) allowing said coating to cool sufficiently to harden to withstand major deformation upon handling, and
   (5) maintaining said coated food in a chilled environment substantially throughout a period of storage.

5. The method of claim 4 further characterized in that the wetting agent consists essentially of lecithin.

6. A method of claim 4 further characterized in that the storage environment for the coated food is not higher than 40° F. (4.4° C.).

7. A method of preserving foods consisting essentially of
   (1) mixing lard, a second fat consisting essentially of tallow or of partially hydrogenated lard and lecithin, the ratios of lard, said second fat, and lecithin being between 30:70:1 and 50:50:1,
   (2) melting said mixture and adjusting it to approximately 85° F. (29.4° C.),
   (3) thoroughly coating said food with said mixture,
   (4) allowing said coating to harden on said food until said coating will withstand normal handling, and
   (5) maintaining said coated food throughout a storage period in an environment not warmer than 40° F. (4.4° C.).

8. The method of claim 7 further characterized in that the preferred ratio of the ingredients of said mixture consists essentially of approximately 40% lard, 60% tallow and 1% lecithin.

9. The method of claim 7 further characterized in that prior to being coated with said mixture the food is maintained at a generally uniform temperature slightly greater than the temperature at which said food freezes or at which said food may be injured by excessive chilling.

10. The method of claim 9 wherein the food consists essentially of a meat or meat product and the temperature of said meat or meat product at the time of coating is between 27° F. (−2.8° C.) and 30° F. (−1.1° C.).

* * * * *